June 20, 1961 B. KIRSTEN Re. 24,999

COMBINED KNOB AND DIAL

Original Filed Aug. 16, 1954

INVENTOR.
BERNDT KIRSTEN
Berndt Kirsten

United States Patent Office

Re. 24,999
Reissued June 20, 1961

24,999
COMBINED KNOB AND DIAL

Berndt Kirsten, 606 N. Gardner St., Los Angeles, Calif.

Original No. 2,819,698, dated Jan. 14, 1958, Ser. No. 449,960, Aug. 16, 1954. Application for reissue May 2, 1958, Ser. No. 735,656
13 Claims. (Cl. 116—124)

Matter enclosed in heavy brackets [ ] appears in the original patent but forms no part of this reissue specification; matter printed in italics indicates the additions made by reissue.

The present invention relates to improvements in knobs of a novel type, useful in indicating, controlling, selecting *and* dialing [or] *of* instrument knobs for radio, television, radar, and other electronic instruments, as well as for mechanical and military equipment, and the like.

The [average] knob *of the present art* [now] used [on] *for* television, radio and other electronic equipment is *generally* of small diameter and usually incorporates a hand or pointer for play over graduations of some character. Sometimes the knob incorporates a detent which [effects] *offers* resistance to knob-turning, [and] which difficulty [in turning] is enhanced due to *its* small diameter.

It is an object of this invention to provide a knob arranged to house and carry a dial and indicator, and *which is* attractive in appearance, efficient in operation, of simple construction, and inexpensive to manufacture.

It is another object of this invention to provide a compact mechanism, including a dial and pointer, all housed in the knob.

In particular, the present invention contemplates a knob which confines an indicia bearing dial, over which dial an indicator may play when the knob is rotated. Thus, the present knob eliminates dial etching or printing on an instrument panel, *or other fixed support* and also eliminates that form of indicator and dial which includes windows in the instrument panel, behind which *windows* are placed dials and a mechanism to move indicators thereacross or thereover. Hence, the gained space on the panel allows use of a knob of substantial diameter.

In one preferred embodiment of my invention, I contemplate a knob arranged to [house and] carry a dial which will remain stationary while the knob is rotated, while an indicator in the form of a pointer cooperates with indications on the dial when the knob is turned or rotated.

With the above mentioned and other objects in view, the invention consists in the novel and useful provision, formation, construction, association, and relative arrangement of parts, members and features, all as shown in certain embodiments in the accompanying drawing, described generally, and more particularly pointed out in the claims.

Figure 1:
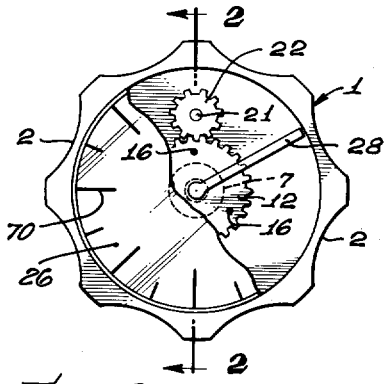
FIGURE 1 is a front elevation of a knob, certain parts being broken away, and incorporating the invention.
Figure 2:
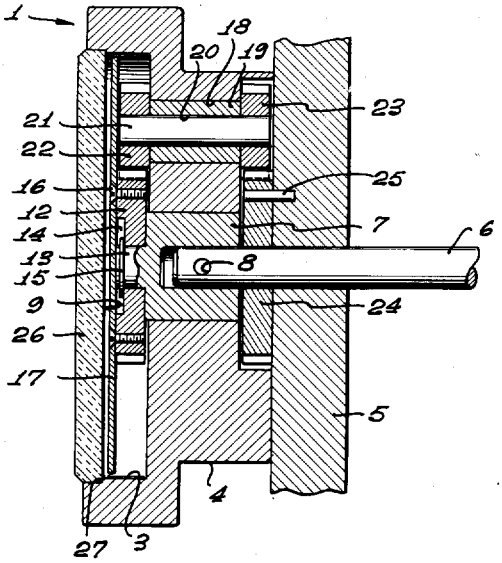
FIGURE 2 is a sectional view of the line 2—2 of FIGURE 1, and on an enlarged scale from FIGURE 1.

In the form shown in FIGS. 1 and 2, a manually rotary knob 1 is arranged to adjust an instrument shaft 6, extending through a panel 5. To facilitate manual adjustment, the periphery of the knob 1 is formed with spaced flutes or corrugations 2, whereby the knob may be readily grasped by the fingers to rotate the same. The knob has a cylindrical body portion 4, adapted to lie [close to] *adjacent* the panel 5. The knob may be made of plastic, with a central metal bushing 7 into which shaft 6 is fastened [, as] by a set screw 8. The knob 1 is thus directly coupled to the shaft 6.

The outer facing wall of the knob 1 has a circular recess 3, serving to house a dial 17 and appropriate mechanism for maintaining the dial in angularly fixed position. This dial has a diameter [only] slightly less than that of the recess 3. A transparent cover member *or window* 26 covers recess 3, and is accommodated on shoulder 27.

For conveniently supporting the dial 17, it is *rotatably* mounted on a stub shaft extension 13, integral with the bushing 7. This mounting is accomplished by the aid of a gear [member] 12. The dial 17 is attached to the left-hand face of the gear *12* by screws 16, and the gear, in turn, is *rotatably* mounted upon the stub shaft 13. A recess 14 in the left-hand face of the gear 12 permits the use of a spring ring 15 for restraining axial movement of the gear 12.

Although the gear 12 is mounted on a shaft extension 13, it is not *directly but rotatably* coupled thereto. Accordingly, the knob 1 can be turned without turning the gear 12.

In order to maintain the dial 17 stationary *relative to a fixed point,* use is made of a planetary gear system which holds the gear 12 in a non-rotary condition. For this purpose, a stationary sun gear 24 of identical size as the gear 12 is fixed to the panel 5, as by the aid of the pin 25. This gear 24 is located in a recess in the rear of the cylindrical body 4 and is co-axial with shaft 6 and gear 12.

Engaging the gear 24 and the gear 12 are the planetary gears 23 and 22 respectively. These planetary gears are mounted on a shaft 21, rotatable within a bearing bushing 19, supported in the knob structure 1. The bore 20, accommodating the shaft 21, is radially spaced from the axis of the dial. Since the gears 24 and 12 have identical diameters and pitch, and since the planetary gears 23 and 22 are likewise of identical diameter and pitch, rotation of the knob 1, and concomitant planetary movement of the shaft 21, maintain the gear 12 and *dial 17 in* non-rotary position.

*While sun gears and planetary gears have been shown herein, equivalent transmission means, such as chains, velvet drives, or the like may alternatively be used.*

The stationary dial 17 and the knob structure 1 are provided with a cooperating scale and pointer. In the present instance, the pointer 28 is mounted on the inner surface 9 of the transparent cover or window 26, and indicia, such as lines 70, are marked upon the dial 17. Of course, the positions of the pointer and scale could be interchanged. Furthermore, the scale could be in the form of graduated marks, or the like, as desired.

Figure 3:
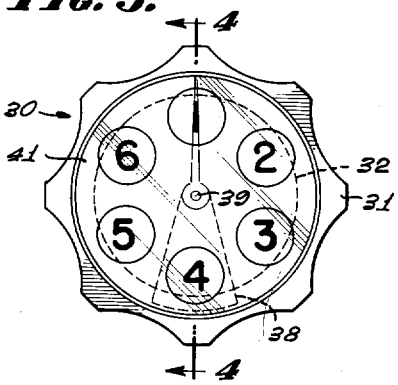
FIGURE 3 is a front elevation of a knob having an indicator dial of slightly different construction.
Figure 4:
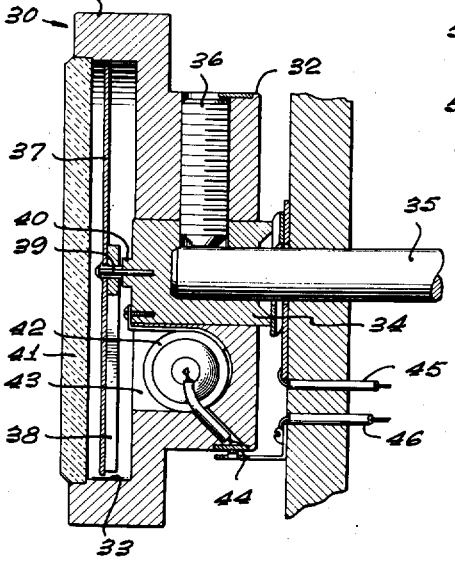
FIGURE 4 is a sectional view on the line 4—4 of FIGURE 3.

That form of the invention shown in FIGS. 3 and 4 includes a knob 30 having two portions of different diameter 31 and 32, the periphery of portion 31 being fluted or corrugated, with the portion 31 formed with a circular recess 33. The knob, as before, is provided with a metallic bushing 34, receiving one end of shaft 35 [,] *and* being locked thereto by means of a set screw 36 passed through a threaded opening in the knob and bushing. A dial 37 carrying numerals has secured to its rear surface a sector-shaped weight 38, there being a pin mounting for the dial at 39, which pin mounting is carried by bushing 34. The said bushing 34 has an extension 40, which bears against a portion of the weight for spacing both the weight and the dial within the recess 33. As before, a window or cover 41 is carried by the knob forwardly of the dial 37. In this construcion, it is evident that the weight acts to maintain the dial in a definite angular position on pin 39 even when the knob is turned, so that the dial remains stationary. As before, a pointer is secured to the inner surface of the window 41 for play over the dial.

Another feature of that form of the invention shown in FIGS. 3 and 4 consists in providing illumination for the dial. Thus, an incandescent bulb 42 is housed within a recess 43 of the knob, which recess opens toward recess 33, with a ground connection for one terminal of the bulb and a wiping contact 44 for the other terminal. Suitable leads 45 and 46 connect both the wiping contact and the ground connection, and a source of power. The dial 37 may be translucent, to permit passage of light through it. *This type of illumination arrangement may alternately be applied to the embodiments shown in FIGS. 1 and 5, as well.*

As before, the shaft 35 is passed through the front wall of an instrument panel for the rotating of a condenser, or other device, when the knob is rotated.

Figure 5:
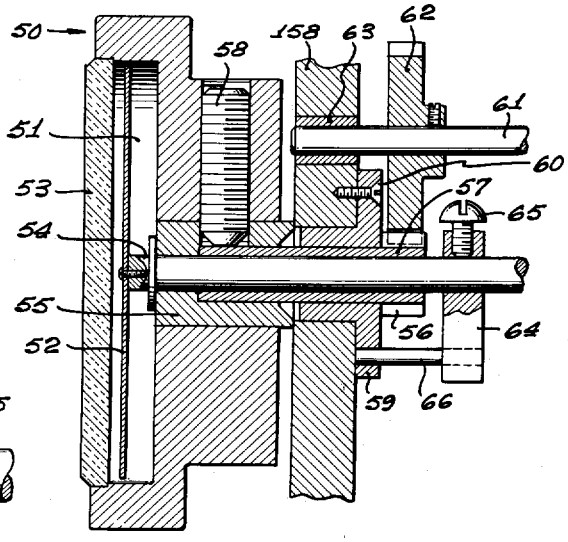
FIGURE 5 is a transverse sectional view of a knob and its indicator showing a modification of the invention from the previous figures.

That form of the invention shown in FIG. 5 includes a knob 50 having the same appearance as the knob shown in FIGS. 1 and 3. The periphery is corrugated or fluted, and said knob is provided with an outwardly facing circular recess 51, within which recess is positioned a dial 52 covered by a window 53 held to said knob at the recessed portion thereof. The dial is secured to one end of a stationary shaft 54, this shaft being passed through a bushing 55 molded in the knob. The shaft 54 is provided with a collar which engages the inner end of the bushing 55 for limiting axial movement of the shaft in one direction.

A gear 56, having an elongated sleeve type hub 57, is *rotatably* carried upon the shaft 54 and received within the bushing 55. The knob 50 is fastened to said hub by a set screw 58, transversely passed through the knob and said bushing 55, for engagement with the hub 57. Both the hub 57 and the shaft 54 are passed through the front wall 158 of the instrument panel, and to accomplish this, a bushing or sleeve 59 is utilized. Thus, the sleeve 57 is passed through the bore of the flanged bushing 59 and this bushing has its flange portion secured by suitable means, such as a screw or screws 60, at the inner wall of the instrument panel 158. Furthermore, the gear 56 is positioned externally of the flanged bushing 59.

A condenser or instrument shaft 61 carries a gear 62, meshing with gear 56. The shaft 61 is journaled in a suitable bushing 63 mounted within the panel 158. Shaft 54 is restrained against rotation by aid of a block 64 fastened, as by a set screw 65, to said shaft, a pin 66 extending between the flanged bushing 59 and said block.

In the form shown in FIG. 5, it is possible to locate the knob out of a crowded portion of the panel by changing the gears to larger diameter or using other modes of motion transmission, such as chains and sprocket wheels.

The inventor claims:

1. In a device of the character disclosed: [a fixed instrument panel] a rotatable knob [member having] *defining* a circular recess therein, said knob being adapted to be mounted adjacent the wall of [said instrument panel,] *a supporting structure,* a shaft rotatably mounted on said [panel and extending into said recess,] *supporting structure* a dial [member] supported by said knob and within said recess, gear means adapted to hold said dial against rotation, and [detent] means holding *a part of* said [locking] *gear* means stationary relative to said [panel] *supporting structure.*

2. In a device of the character disclosed: [a fixed instrument panel,] a rotatable knob [member having] *defining* a circular recess therein, said knob being mounted adjacent [the wall of said panel,] *a fixed support,* a shaft rotatably mounted on said [panel] *support* [and extending into said recess,] a dial member supported by said [shaft] *knob* [and] within said recess, locking gear means adapted to hold said dial against rotation and [a pin interconnecting] *means securing one gear of* said locking gear means [and said panel] *to said support to hold said dial stationary.*

3. In a device of the character described: [a fixed instrument panel,] a rotatable knob [member,] said knob having a hub portion and *defining* a circular recess in a portion coaxial with said hub portion, [a metallic bushing in] said hub portion, [said bushing] being adapted to mount said knob adjacent [an instrument panel] *a support,* [a shaft rotatably mounted on said panel and extending from said bushing into said recess,] a dial member supported [by said shaft and] within said recess, multiple gear means adapted to hold said dial against rotation, and [a pin] *means* [interconnecting] *affixing* one gear of said gear means [and said panel.] *to said support to hold said dial stationary during rotation of the knob.*

4. In a combined knob and dial device, [a fixed gear support means;] a shaft rotatably mounted on [said gear] *a* support and adapted to actuate a mechanically operable instrument; a knob member [non-rotatably] *fixedly* attached to one end of said shaft, said knob member [being recessed] *forming a recess* to receive a dial; a dial concentrically disposed and independently [rotatable] *mounted* relative to said knob member, and planetary gear means operatively connected to said shaft and to said dial whereby said dial remains in a fixed [axial] *angular* position relative to said support means.

5. In a combined knob and dial device, [a fixed gear support means;] a shaft *adapted to be* rotatably mounted on [said gear] *a* support means and adapted to actuate a mechanically operable instrument; a knob member [non-rotatably attached] *secured* to one end of said shaft, said knob member being recessed to receive a dial, *said* [a] dial concentrically disposed and independently [rotatable] *mounted* relative to said knob member; indicia on the outer face of said dial; and planetary gear means operatively connected to said shaft and to said dial whereby said dial remains in a fixed [axial] *angular* position relative to said support means.

6. In a combined knob and dial device, [a fixed gear support means;] a shaft rotatably mounted on [said gear] *a fixed* support means and adapted to actuate a mechanically operable instrument; a knob member [non-rotatably attached] *secured* to one end of said shaft, said knob member being recessed to receive a dial; a dial concentrically disposed *within* and independently [rotatable] *mounted* relative to said knob member; indicia on the outer face of said dial; a window mounted on said knob forwardly of said dial, said window being provided on one surface with an indicator for play over the indicia on said dial when said knob is rotated; and planetary gear means operatively connected to said [shaft] *fixed support means* and to said dial whereby said dial remains [in a fixed axial position] *stationary* relative to said support means.

7. In a combined knob and dial device, [a fixed gear support means;] a first shaft rotatably mounted on [said gear] *a fixed* support means and adapted to actuate a mechanically operable instrument; a knob member [non-rotatably attached] *secured* to one end of said first shaft, said knob member being recessed to receive a dial and a sun gear; a sun gear within said knob recess, said sun gear being concentric with and attached to a dial; a dial disposed within said knob recess and [rotatable with] *fixed to* said gear; a fixed gear identical to said sun gear, said fixed gear being mounted concentrically with said shaft on said fixed [gear] support means; a second shaft mounted for rotation within said knob, said second shaft being disposed parallel to said first shaft; and a pair of planetary gears on said second shaft, said planetary gears being in mesh with said sun [gear] and said fixed gear *to hold said dial stationary.*

*8. In a combined knob and dial assembly for controlling the shaft of a turnable device mounted on a support, said assembly including: a rotatable knob number having a central bore for receiving said shaft; means for connecting said knob to said shaft; gear means rotatably supporting said dial upon a stub shaft within said knob; said stub shaft having the same axis as said knob; said knob-dial having cooperating indicia for indicating angular displacement of said shaft, and gear means drivingly interconnecting said knob and dial, and a holding member connecting one gear of said gear means to a supporting structure to hold said dial stationary during rotation of said knob.*

*9. In a combined knob and dial device for turning a shaft rotatably mounted adjacent a supporting structure, comprising: a knob concentrically affixed to said shaft, a dial with its indicia in an upright position coaxially rotatably mounted on a gear within said knob structure, said knob and dial having cooperative association with an indicator carried within said knob structure; multiple gear means drivingly interconnecting said knob and dial; and a supporting member connecting one gear of said gear means adacent a supporting structure to hold said dial stationary during rotation of said knob.*

*10. In a combined knob and illuminated dial device for controlling and indicating the angular position of a shaft rotatably mounted on a support comprising: a supporting member holding a gear affixed to a supporting structure; means for connecting said knob concentrically to said shaft; a dial of translucent means; coaxially rotatably mounted within said knob, and a light providing assemblage means within said knob to illuminate said dial, and planetary gearing to hold said dial stationary during rotation of said knob.*

*11. A combined knob and dial device for turning a shaft rotatably mounted on a panel, including: gear means affixed to said panel concentrically with said shaft; a knob coaxially affixed to one end of said shaft and means within said knob structure providing a frontal circular opening;*

*a dial coaxially rotatably mounted within such knob o ing; a transparent portion on said knob over said dial, transparent portion and said dial provided with coop tion indicia for indicating angular movement of said sh and planetary gear means operatively connected to first mentioned gear means and said dial to hold said against rotation during rotation of said knob.*

*12. A combined knob and dial device for turnin shaft rotatably mounted on a supporting structure incl ing: a dial coaxially and independently rotatably mou within said knob; a pair of concentric sun gears, one which is coaxially affixed to said dial and the other which is affixed to a supporting structure; and a pai planetary gears affixed to opposite ends of a gear sh said gear shaft rotatably mounted within said knob planetary revolution around the axis of said sun ge said planetary gears and said gear shaft in driving enga ment with said sun gears to hold said dial stationary a ing rotation of said knob.*

*13. A combined knob and dial device for turnin shaft rotatably mounted on a panel including: a k means for connecting said knob to said shaft; a dial ro ably supported within said knob, said knob having a tra parent front face for viewing the angular setting of s shaft there through; and gear means including a supp ing member for holding one gear of said gear means fi on a supporting structure to keep said dial stationary d ing rotation of said knob.*

References Cited in the file of this patent or the original patent

UNITED STATES PATENTS

| | | |
|---|---|---|
| 2,104,520 | Jackson | Jan. 4, 1 |
| 2,104,521 | Jackson | Jan. 4, 1 |
| 2,222,987 | Perry | Nov. 26, 1 |
| 2,752,878 | Keough | July 3, 1 |
| 2,767,681 | Pontius | Oct. 23, 1 |